Sept. 1, 1925.

F. G. KOCH 1,552,172

WATER POWER PLANT

Filed Dec. 13, 1923

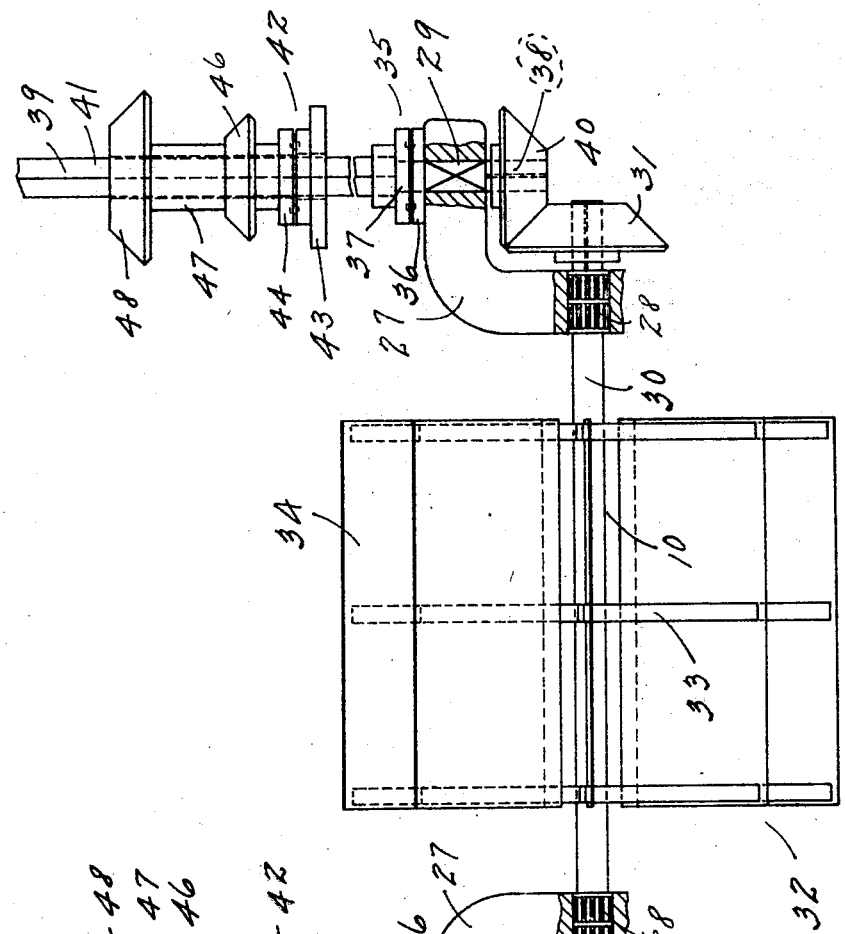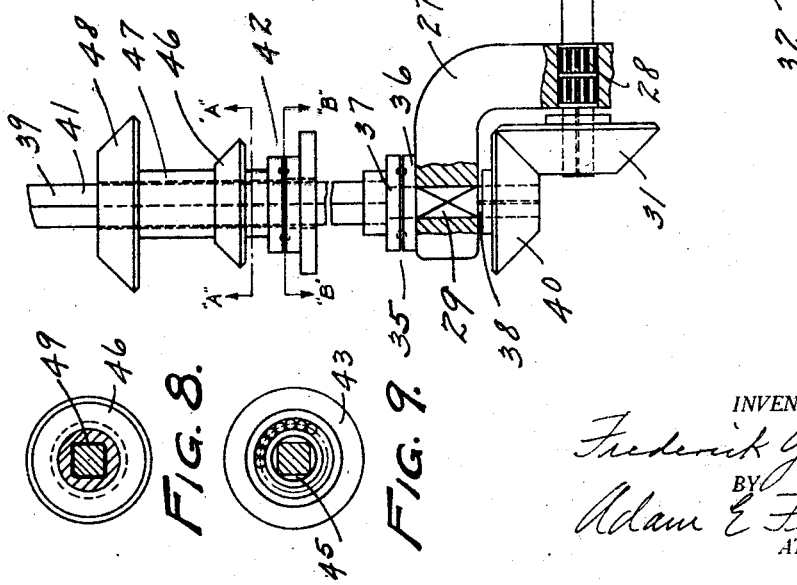

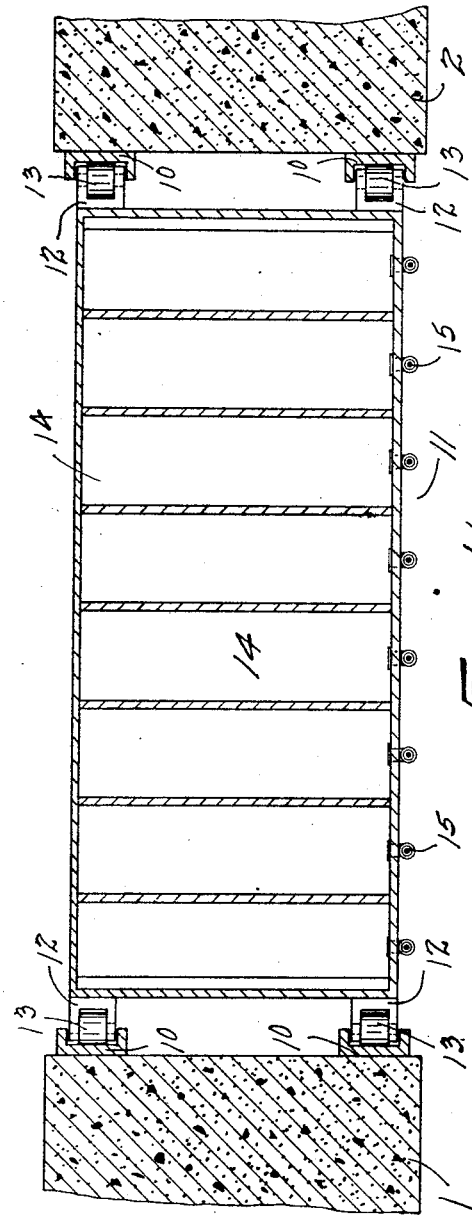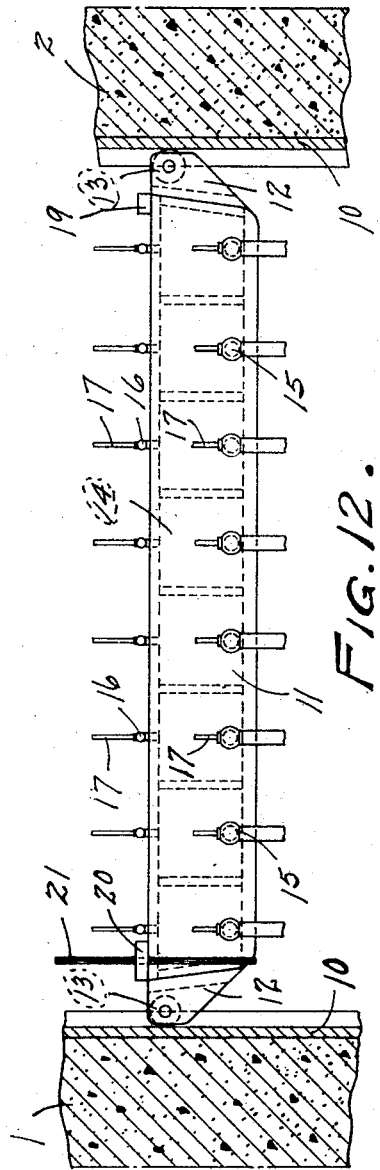

Patented Sept. 1, 1925.

1,552,172

UNITED STATES PATENT OFFICE.

FREDERICK G. KOCH, OF CURRYVILLE, MISSOURI, ASSIGNOR OF ONE-HALF TO F. P. DYE AND O. A. QUISENBERRY, BOTH OF VANDALIA, MISSOURI.

WATER-POWER PLANT.

Application filed December 13, 1923. Serial No. 680,495.

*To all whom it may concern:*

Be it known that FREDERICK G. KOCH, a citizen of the United States, residing at Curryville, in the county of Pike and State of Missouri, has invented certain new and useful Improvements in Water-Power Plants, of which the following is a specification.

This invention pertains to water power plants and is designed to facilitate the development of the water power resources of the country; and its main object is to utilize the strength of the deep currents of the great rivers, which when harnessed with this invention, will produce sufficient power to run dynamos that will produce light, heat and all necessary industrial and domestic power. Another object is to permit the harnessing of the rivers within reach of most of the important cities of the country without the aid of dams and canals, thereby cutting greatly the cost of construction, upkeep and operation, and in this manner permit power to be furnished at a very reasonable cost. A further object is to provide a device that will harness the navigable rivers without interfering with navigation. A still further object is to provide a simple and efficient device that can readily be adjusted to the rise and fall of the river.

In the drawings—

Figure 7 is a detail of the fin wheel shaft and upright drive shafts;

Figure 8 is a section of an upright drive shaft and gear on the line "A—A" in Figure 7;

Figure 9 is a section of an upright drive shaft and ball bearing base on the line "B—B" in Figure 7;

Figure 11 is a horizontal section of a flat boat;

Figure 12 is a side view of a flat boat;

Figure 1:
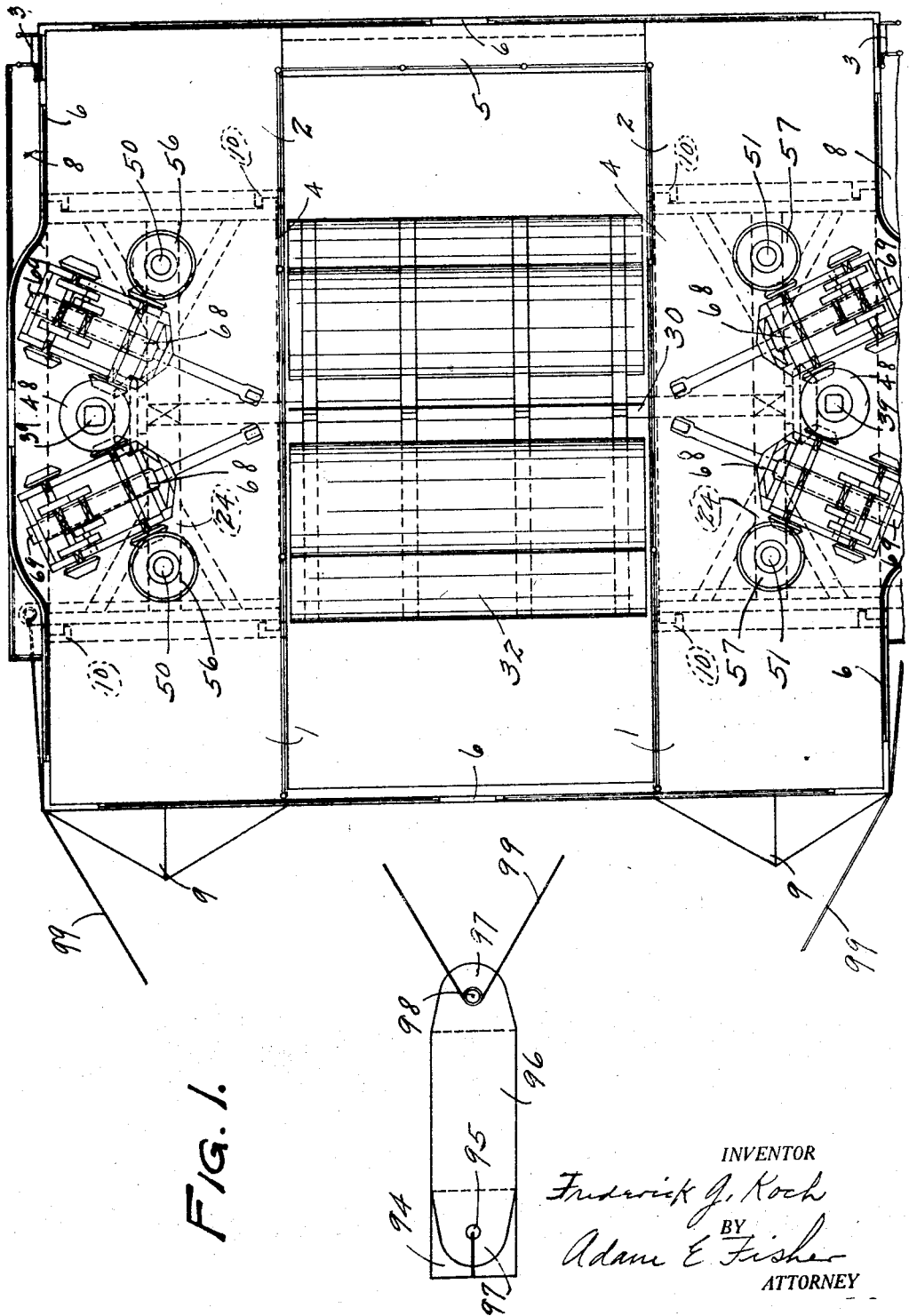
Figure 1 is a plan view, the roof being removed.
Figure 2:
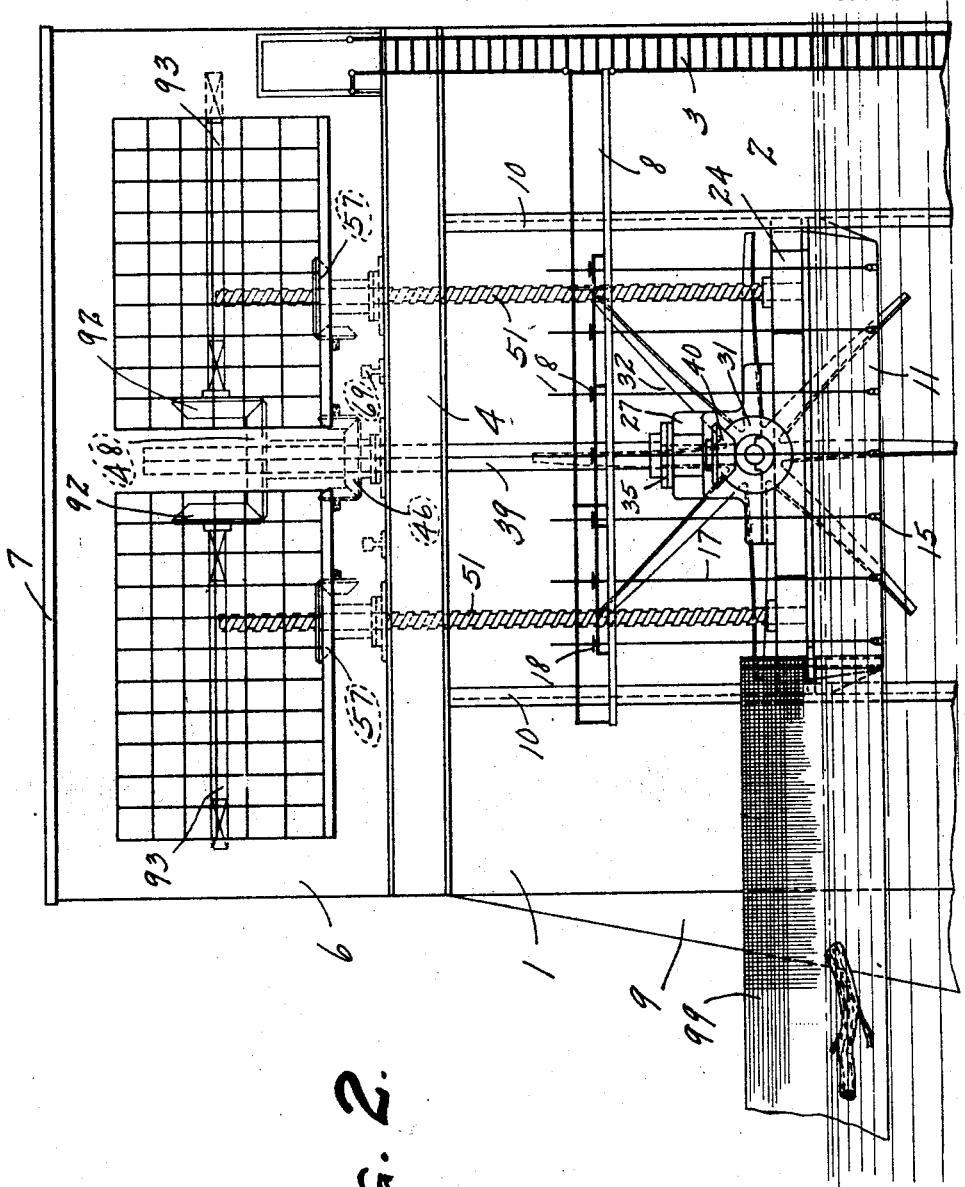
Figure 2 is a side elevation.
Figure 3:
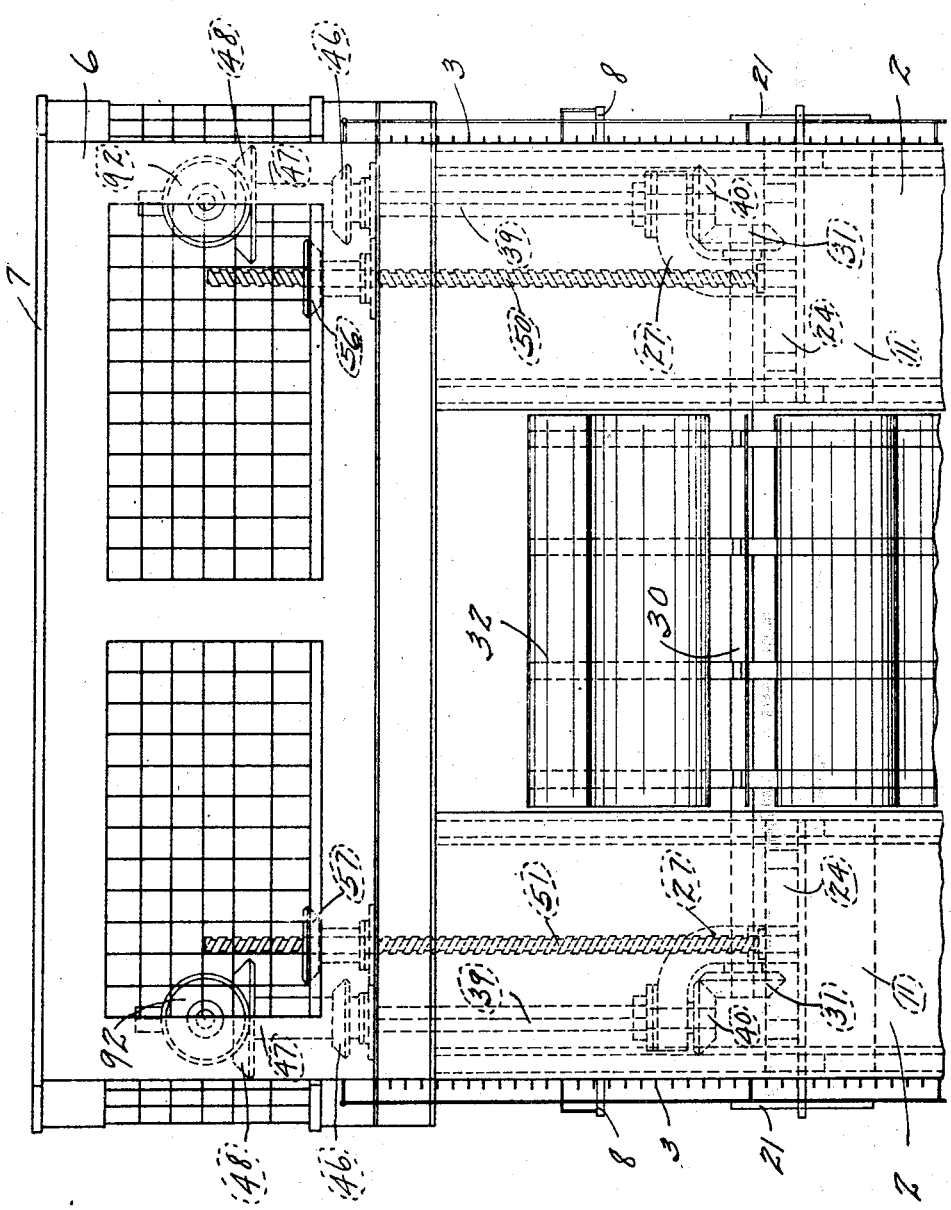
Figure 3 is an end view looking up stream.
Figure 4:
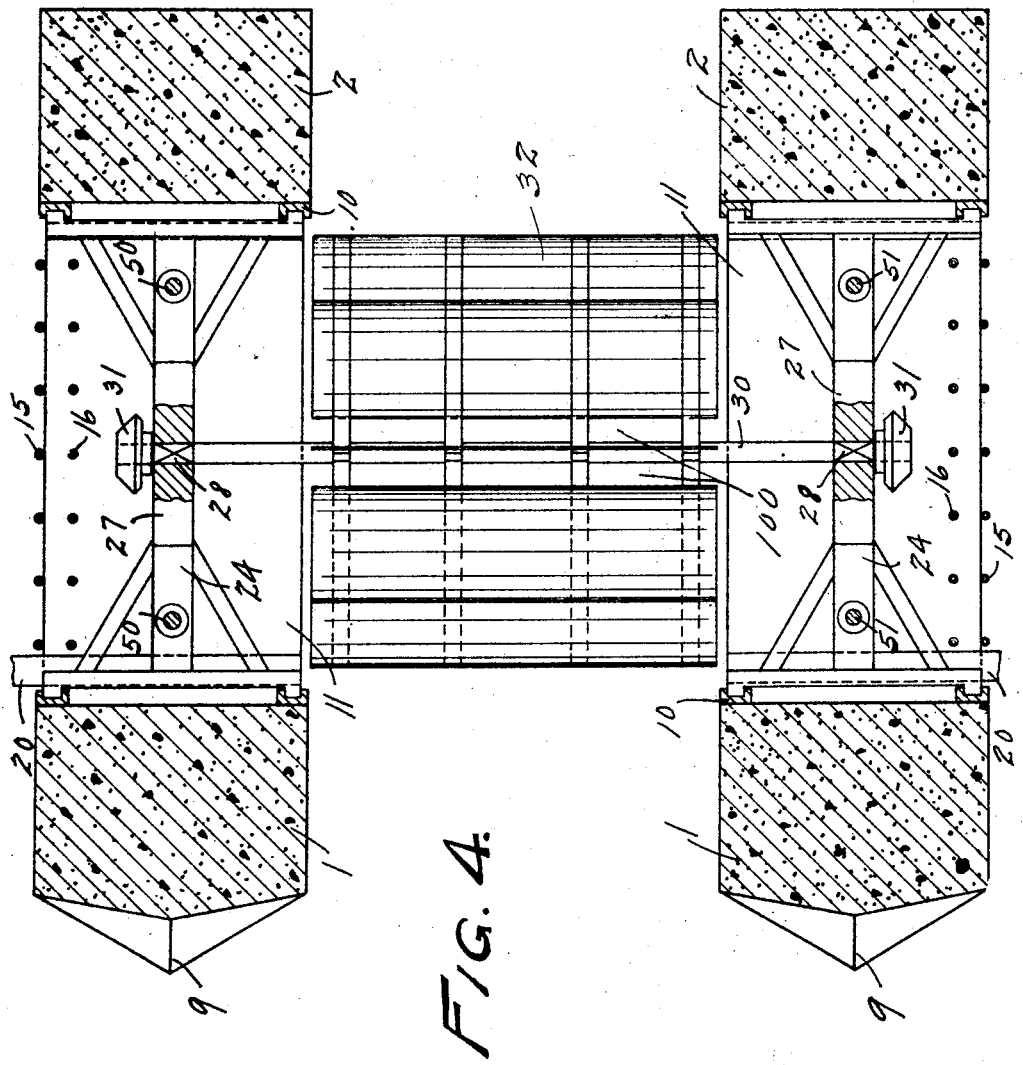
Figure 4 is a horizontal section.
Figure 5:
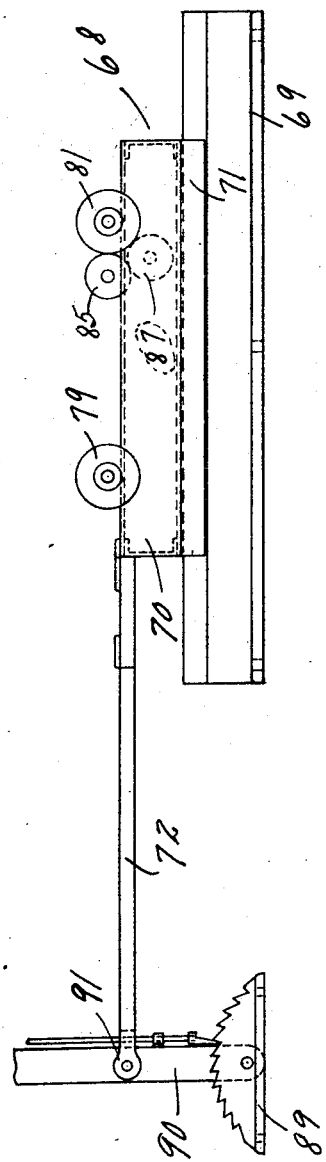
Figure 5 is an enlarged side view of the hoistening gear shift block.
Figure 6:
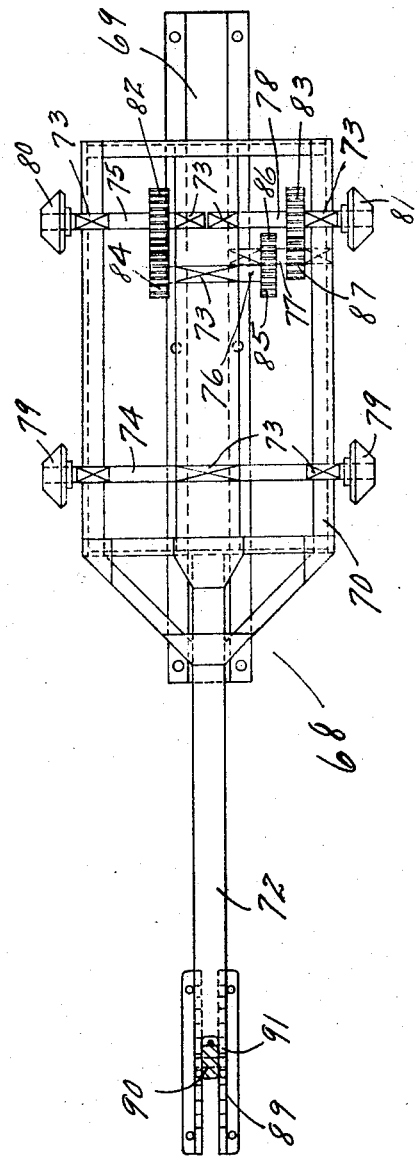
Figure 6 is an enlarged plan view of the hoisting gear shift block.
Figure 10:
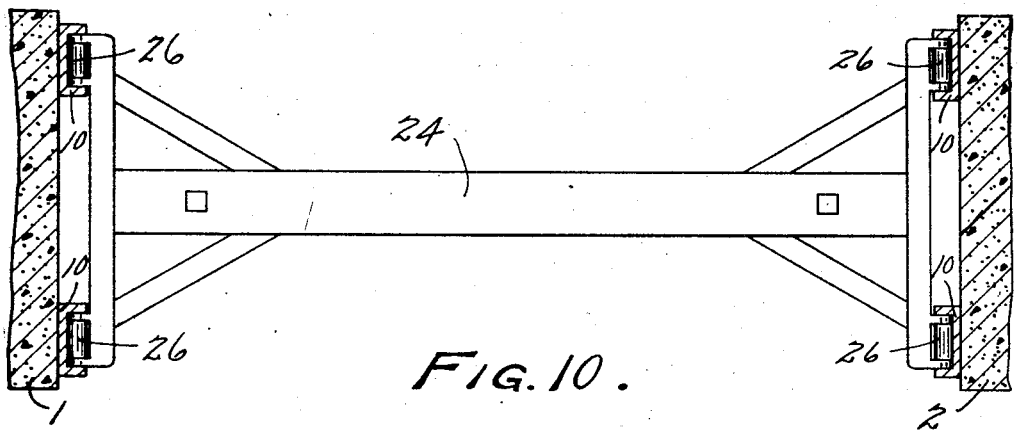
Figure 10 is a detail of the hoisting base.
Figure 13:
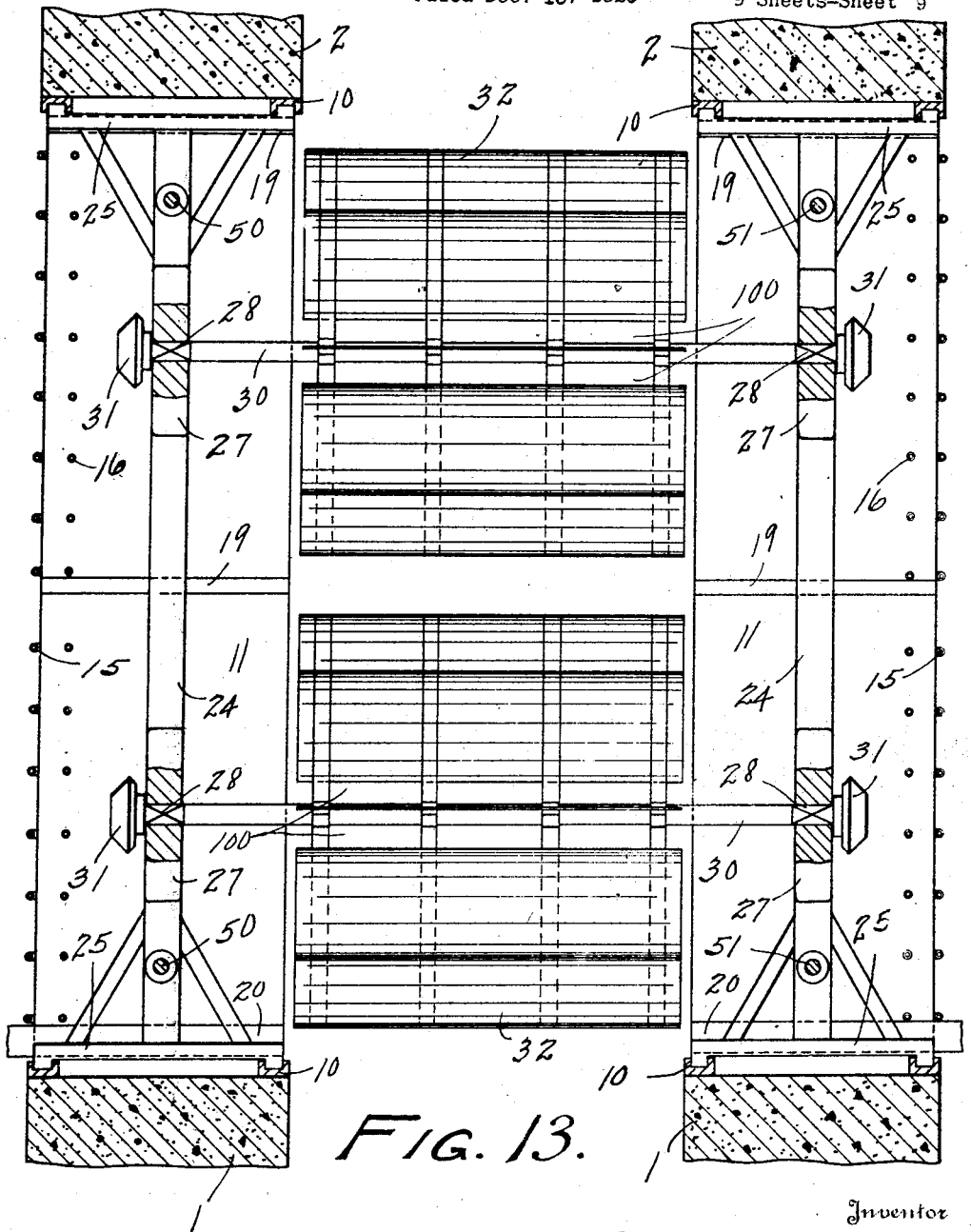
Figure 13 is a horizontal section showing the fin wheels arranged for use in gangs.

In carrying out this invention, I provide four concrete piers or abutments and locate the same in the river whose power is to be developed. The two upstream piers, as shown at 1, and the two downstream piers, as shown at 2, are spaced transversely across the current, while the respective piers 1 and 2 are spaced in line with the current. Ladders 3 are secured to the sides of the abutments 2 to provide means for reaching the tops of the said abutments. Hoisting bridges 4 span the tops of the said abutments 1 and 2. The said hoisting bridges 4 may be joined together by beams, if desired, and a flooring laid across the same to permit dynamos and other apparatus to be mounted thereon; or the beams and flooring may be omitted as shown in Figure 1, and a communicating suspension bridge 5 installed between the abutments 2. Walls 6 and a roof 7 are built on the top of said abutments 1 and 2 to house the dynamos and other apparatus that may be installed. Operating suspension bridges 8 are secured to the sides of the abutments 1 and 2 for a purpose to be later explained. The up stream sides of the abutments 1 are V shaped and taper to the top as shown at 9 for breaking the current. Tracks 10 are secured vertically to the inner sides of the abutments 1 and 2. Flat boats 11 are provided. The ends 12 of the said flat boats 11 carry rollers 13, which engage the tracks 10. The said flat boats 11 are divided into compartments 14 which may be filled with water or air to permit submerging or raising the said flat boats 11 as desired. Water valves 15 are secured near the bottom on the outer sides of the said flat boats 11 and communicate with the said compartments 14 for submerging purposes, while air valves 16 are secured to the top of the flat boats 11 and communicate with the said compartments 14 to permit pumping air into the said compartments 14 so as to force the water out through the water valves 15 and thus raise the said flat boats 11.

Square valve adjustment rods 17 that engage the water valves 15 and air valves 16 are run up and through the operating suspension bridges 8, and hand wheels 18 mounted on the said suspension bridges 8, slidingly engage the square valve adjustment rods 17 so as not to interfere with the submerging or raising of the said flat boats 11. Beams 19 are secured to the tops of the flat boats 11 on the down stream end for spacing purposes, while beams 20, carrying rods 21, the purpose of which will be explained later, are secured to the tops of the flat boats 11, on the upstream end, for spacing purposes. Hoisting bases 24 rest upon the beams 19 and 20 of the flat boats 11, and the ends 25 of the said hoisting bases 24 carry rollers 26 which engage the tracks 10. Angular bearing supports 27 are secured to the hoisting bases 24 and carry in their lower portions and immediately above the said hoisting bases 24, horizontally mounted roller bearings 28, and in the forward ends of their upper portions, vertically mounted Babbitt bearings 29. A shaft 30 is journaled in the roller bearings 28, and carries rigidly mounted cog wheels 31 on its ends. A fin wheel 32 is mounted upon the shaft 30 between the hoisting bases 24. The said fin wheel 32 whose arms 33 are curved and rigidly secured to the shaft 30, has correspondingly curved plates 34 secured to the said arms 33 in such a manner as to provide a space as shown at 100 to prevent slosh water from clogging and weighting the fin wheel. Ball bearing shaft supports 35, consisting of lower ball bearing race sections 36, and upper ball bearing race sections and shaft sockets 37, are mounted on the forward ends of the upper portions of the angular bearing supports 27 and in line with the vertical bearings 29. The turned ends 38 of square shafts 39 are passed through the ball bearing shaft supports 35 and journaled in a vertical position in the vertically mounted bearings 29 of the angular bearing supports 27. The square portion, immediately above the turned ends 38 of the said square shafts 39 engage the upper ball bearing race sections and shaft sockets 37, and prevent the said square shafts 39 from sliding down and wedging the beveled cog wheels 40 against the beveled cog wheels 31. Beveled cog wheels 40, enmeshing with the beveled cog wheels 31, are rigidly secured to the lower portions of the turned ends 38 of the square shafts 39. The upper ends 41 of the said square shafts 39 pass through the hoisting bridges 4. Ball bearing gear supports 42 are mounted over the square shafts 39 and consist of lower race sections 43 and upper race sections 44. The lower race sections 43 are rigidly secured to the hoisting bridges 4 and loosely engage the square shafts 39, as shown at 45. The upper race sections 44, beveled gears 46, gear spacers 47 and beveled cog wheels 48, slidingly engage the square shafts 39, as shown at 49, to permit the hoisting bases 24 to rest securely on the flat boats 11 at all times, while being submerged or raised. Right hand worm hoisting screws 50, and left hand worm hoisting screws 51, their lower ends 52 and 53 respectively, having means for fastening purposes, embodied therein, are rigidly secured to the hoisting bases 24. The upper ends 54 and 55 of the respective right and left hand worm hoisting screws 50 and 51 pass through the hoisting bridges 4 and engage right and left hand worm hoisting screw gears 56 and 57 having respective ball bearing bases 58 and 59 incorporated therein. The said ball bearing bases 58 and 59 of the right and left hand worm hoisting screw gears 56 and 57 comprise respective lower race sections 66 and 67, upper race sections 62 and 63 and shanks 60 and 61 as shown in Figures 15 and 16. The lower race sections 66 and 67 are rigidly secured to the hoisting bridges 4 while the upper race sections 62 and 63, the shanks 60 and 61 and the gears 56 and 57 which have respective right and left hand threads 64 and 65 cut therein, are rotatively mounted upon the lower race sections 66 and 67 and engage the upper ends 54 and 55 of the right and left hand worm hoisting screws 50 and 51. Hoisting gear shift blocks 68 are slidingly mounted upon tracks 69 and operatively communicate with the beveled gears 46 and the right and left hand worm hoisting screw gears 56 and 57. The said hoisting gear shift blocks 68 consist of frames 70 having guides 71 which engage the tracks 69, incorporated therein. Arms 72 are rigidly secured to the frames 70 and with their ends 91 pivotally engage levers 90 which are pivoted in ratchets 89 that are rigidly secured to the hoisting bridges 4. A shaft 74 carrying beveled gears 79 is journaled to the frame 70 by means of bearings 73 for lowering the hoisting bases 24, while shafts 75 and 78 carrying respective beveled gears 80 and 81 and spur gears 82 and 83 are journaled to the said frame 70 by means of bearings 73 for raising the hoisting bases 24. A shaft 76 carrying a spur gear 85 and a spur gear 84 which meshes with the spur gear 82, is journaled to the frame 70 through the medium of the bearing 73. A shaft 77 which is journaled to the frame 70 by means of bearings 73 carries a spur gear 86 which meshes with the spur gear 85 and a spur gear 87 which meshes with the spur gear 83. Shafts 93 carrying beveled cog wheels 92 which mesh with the beveled cog wheels 48 are provided to provide means for driving dynamos and other apparatus. A concrete pier 94 carrying an anchor column 95 is located a considerable distance from the abutments 1 in the upper stream in line with the center of the fin wheel 32. A raft 96, by one end 97 is slidingly secured to the anchor column 95, while its opposite end 97 carries a rod 98. A wire netting or screen 99 is secured to the rods 98 and 21 to prevent logs and other refuse coming down stream from clogging or breaking the fin wheel 32.

In Figure 19 is shown an arrangement of my invention when used in gangs or sets; two fin wheels 32 being mounted on the hoisting bases 4. In this arrangement four square shafts 39 and two right hand worm hoisting screws 50 and two left hand worm hoisting screws 51 are used. Each square shaft 39 operatively communicates with a worm hoisting screw through the medium of a hoisting gear shift block 68. The arrangement described, as shown in Figure 19 is preferred, and gives best results in rivers 25 feet or more in depth.

The device when located in a deep current river as described will operate as follows: The currents of water passing through the netting or screen 99 bear upon the submerged plates 34 of the fin wheel 32 and rotate the same, thus causing the shaft 30 to which the said fin wheel 32 is rigidly secured to rotate the square shafts 39, which supply the shafts 93 with power through the beveled cog wheels 48 and 92, through the medium of the beveled cog wheels 31 and 40. The flat boats 11 upon which the hoisting bases 24 rest are always submerged a certain distance and raise or lower with the rise or fall of the river. When the river falls and the flat boats 11 lower with the fall of the river, the hoisting bases 24 which carry the fin wheel 32 thru the medium of the shaft 30, are suspended upon the worm hoisting screws 51. In order that they may be readily lowered so that the plates 34 of the fin wheel 32 may be submerged to their normal depth, the hoisting gear, shifting blocks 68 are shifted, until the beveled gears 79 mesh with the beveled gears 46 and 57, which cause the said worm hoisting screws 51 to rotate, due to the rotation of the square shafts 39 and thus lower the hoisting bases 24. When the river rises, in order that the flat boats 11 may raise and the fin wheel 32 be raised to its normal depth, the hoisting gear shifting blocks 68 are shifted until the beveled gears 80 and 81 mesh with the respective beveled gears 46 and 57 so that the worm hoisting screws 51 may rotate and thus raise the hoisting bases 24 so as to permit the said flat boats 11 to raise. If it is desired to sink the flat boats 11 in order to submerge the fin wheel 32 below its normal depth, the valves 15 of the flat boats 11 are opened and water permitted to enter the compartments 14 until the said flat boats 11 are submerged to the desired depth, whereupon the hoisting gear shifting blocks 68 are shifted until the respective gears come in mesh in order to lower the hoisting bases 24 through the medium of the worm hoisting screws 51. When it is desired to raise the flat boats 11 the valves 15 and 16 are opened; the valves 15 being opened to permit the expulsion of the water from the compartments 14, while the valves 16 are opened to permit pumping air which may be supplied by compressors (not shown) mounted upon the hoisting bridges 4 and driven indirectly by the fin wheel 32 into the compartments 14 for raising the said flat boats 11.

While I have herein described a certain specific method of constructing and assembling the elements of my invention, it is understood same may be varied in minor details not departing from the spirit of my invention as defined in the appended claims.

I claim:

1. A water power plant designed to be located in deep current rivers and including spaced piers, bridges supported by the piers, boats adapted to rise and fall with the water and guided by the piers, hoisting bases resting upon the said boats, a fin wheel carried by the hoisting bases, means for transmitting power from the fin wheel to mechanism on the bridges, and mechanism connecting the hoisting bases with the bridges for raising and lowering the latter, the boats being movable downwardly independently of the hoisting bases with the fall of the water to avoid straining the said mechanism.

2. A water power plant designed to be located in deep current rivers and including spaced piers, bridges spanning the tops of the piers, flat boats guided by the piers and adapted to be submerged or raised, hoisting bases resting upon the flat boats, a fin wheel carried by the hoisting bases and mechanism connecting the hoisting bases with the bridges for raising and lowering the same, the boats being movable downwardly with the fall of the water independently of the hoisting bases to avoid straining the said mechanism.

3. A water power plant including spaced piers, boats located between the piers and movable upwardly and downwardly between the same, hoisting bases resting upon the said boats, a fin wheel carried by the hoisting bases, gearing connected with the fin wheel, worm hoisting screws vertically mounted between the piers and secured to the hoisting bases, the boats being movable downwardly independently of the hoisting bases to permit the boats to fall with the water without straining the said gearing, gears, and gear shifting blocks for connecting the worm hoisting screws with the said gearing for raising and lowering the hoisting bases by the power from the fin wheel.

4. A water power plant including piers spaced apart to provide a fin wheel passage and boat receiving spaces, bridges spanning the piers, boats guided between the piers in the said boat receiving spaces, a fin wheel operating in the fin wheel passage and carried by the said boats and mechanism connecting the fin wheel with the bridges, the boats being movable downwardly with the fall of the water independently of the fin wheel to avoid straining the said mechanism connected with the fin wheel.

5. A water power plant embodying spaced piers, boats guided between the piers, a fin wheel carried by the flat boats, means for transmitting power from the fin wheel, a raft located in advance of the fin wheel and mounted to rise and fall with the water and provided with a screen for shielding the fin wheel from floating objects, the boats being movable downwardly independently of the fin wheel to fall with the water without straining the fin wheel and the means for transmitting power therefrom.

6. A water power plant including spaced piers, an overhead structure connecting the fin wheel, boats guided by the piers, hoisting bases resting upon the boats, a fin wheel carried by the hoisting bases, gearing connecting the fin wheel with the overhead structure, means including slidable blocks arranged in pairs and carrying gears for connecting the said hoisting mechanism with the gearing for disconnecting it therefrom, said boats being movable downwardly with the fall of the water independently of the hoisting bases to prevent straining the gearing and the hoisting mechanism.

In testimony whereof I affix my signature.

FREDERICK G. KOCH.